United States Patent [19]
Alonso Astarloa

[11] 3,880,511
[45] Apr. 29, 1975

[54] IMAGE PROJECTOR

[76] Inventor: Jose Manuel Alonso Astarloa, c/o Jose Ma Escuza 3-4a Planta, Bilbao (13), Spain

[22] Filed: Apr. 16, 1973

[21] Appl. No.: 351,389

[52] U.S. Cl. ............. 353/79; 353/71; 353/96; 353/101; 353/122; 355/21; 355/63; 355/72
[51] Int. Cl. .................. G03b 21/30; G03b 1/42
[58] Field of Search ......... 353/5, 6, 39, 71, 79, 95, 353/96, 100, 101, 122; 355/18, 21, 62, 63, 72; 248/159

[56] References Cited
UNITED STATES PATENTS
| | | | |
|---|---|---|---|
| 2,056,279 | 10/1936 | Kulick | 355/72 |
| 2,303,920 | 12/1942 | Drucker | 355/63 |
| 2,495,061 | 1/1950 | Hanson | 355/72 |
| 2,501,469 | 3/1950 | Kouzminsky | 355/62 |

FOREIGN PATENTS OR APPLICATIONS
| | | | |
|---|---|---|---|
| 803,900 | 7/1936 | France | 248/159 |

*Primary Examiner*—Harry N. Haroian
*Assistant Examiner*—Steven L. Stephan
*Attorney, Agent, or Firm*—Blum, Moscovitz, Friedman & Kaplan

[57] ABSTRACT

An improved slide projector is provided for magnifying and projecting transparencies on a receiving surface. The projector is adjustably carried on a column which is mounted on a base. The column is pivotally connected to the base for rotating the projector for projecting a selected transparency on either a horizontal or vertical surface, as desired.

7 Claims, 7 Drawing Figures

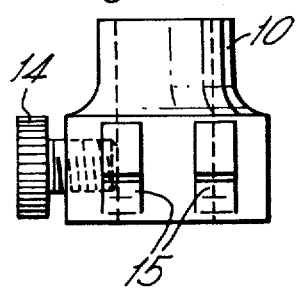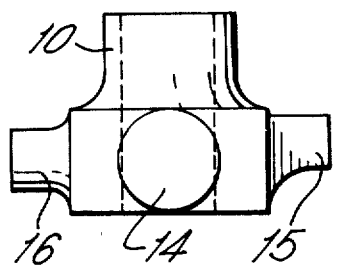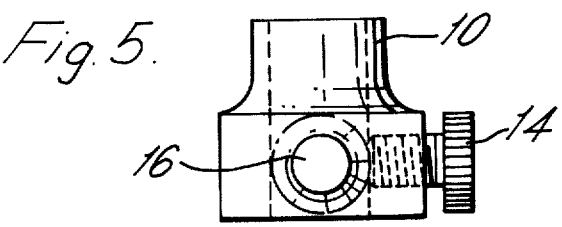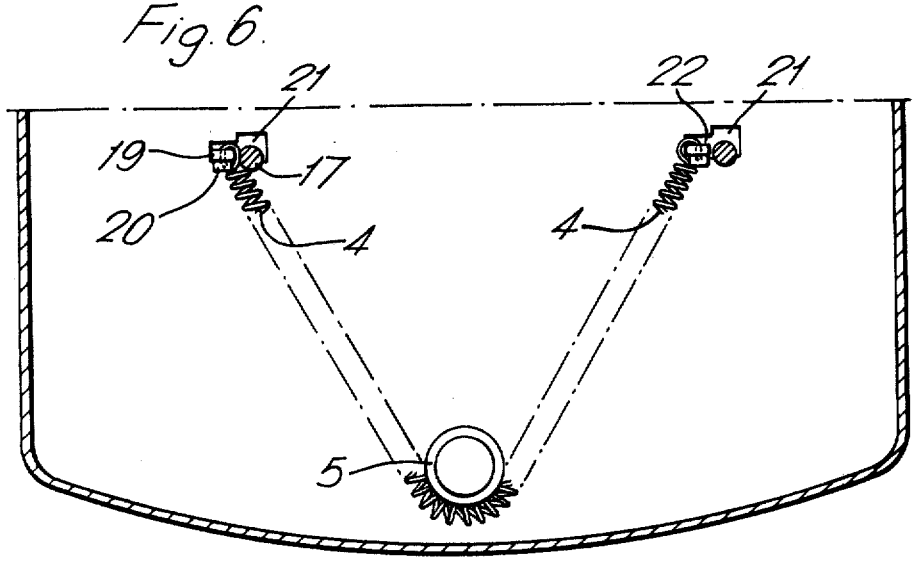

IMAGE PROJECTOR

BACKGROUND OF THE INVENTION

This invention relates to an improved slide projector, and more particularly to a slide projector which may be adjusted for projecting a selected slide on either a horizontal or vertical surface, as desired.

The instant invention may be economically fabricated, readily assembled and easily operated. It is, moreover, versatile in performance, since slides may be projected on either horizontal or vertical receiving surfaces, by simple mechanical adjustment thereof. This improved slide projector includes few moving parts and may be expected to endure over a long useful life.

SUMMARY OF THE INVENTION

Generally speaking, an improved projector for magnifying and projecting slides is provided comprising a base, a column mounted on the base and a slide projector supported by the column. A transverse intermediate supporting arm links the column and slide projector. The column is provided with a pivot joint for rotating the slide projector from a first vertical position to a second horizontal position. In a vertical position the projector projects a slide image along a vertical axis on to the base of the device, while an image may be projected onto a suitable vertical surface, for instance a screen, when the projector is rotated to a horizontal position.

A clamp collar is slidably mounted on the column for fixing the pivot joint therein for vertically arranging the column. When the clamp collar is released from the pivot joint, column and projector may be rotated to a horizontal position for projecting an image on a vertical surface. The clamp collar is provided with a wing for supporting the column, in a rotated horizontal position, on the base of the device.

The base is provided with a spring biased resilient rod, configured for pressure restraining a projection screen on the surface of the base. Paper, fabric or the like may be employed as a projection screen and a magnified image of a selected design may be projected thereon for tracing, copying or drawing.

Still other advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 3 and 5 are respective sectional views of an embodiment for a slidable clamp collar which may be mounted on the column for fixing or releasing the pivot joint therein;

FIG. 4 is an elevational view of the clamp collar shown in FIGS. 3 and 5;

FIG. 6 is a fragmentary bottom plan view of the base for the slide projector with the casing cut away;

DESCRIPTION OF THE PREFERRED EMBODIMENTS

Figure 1:
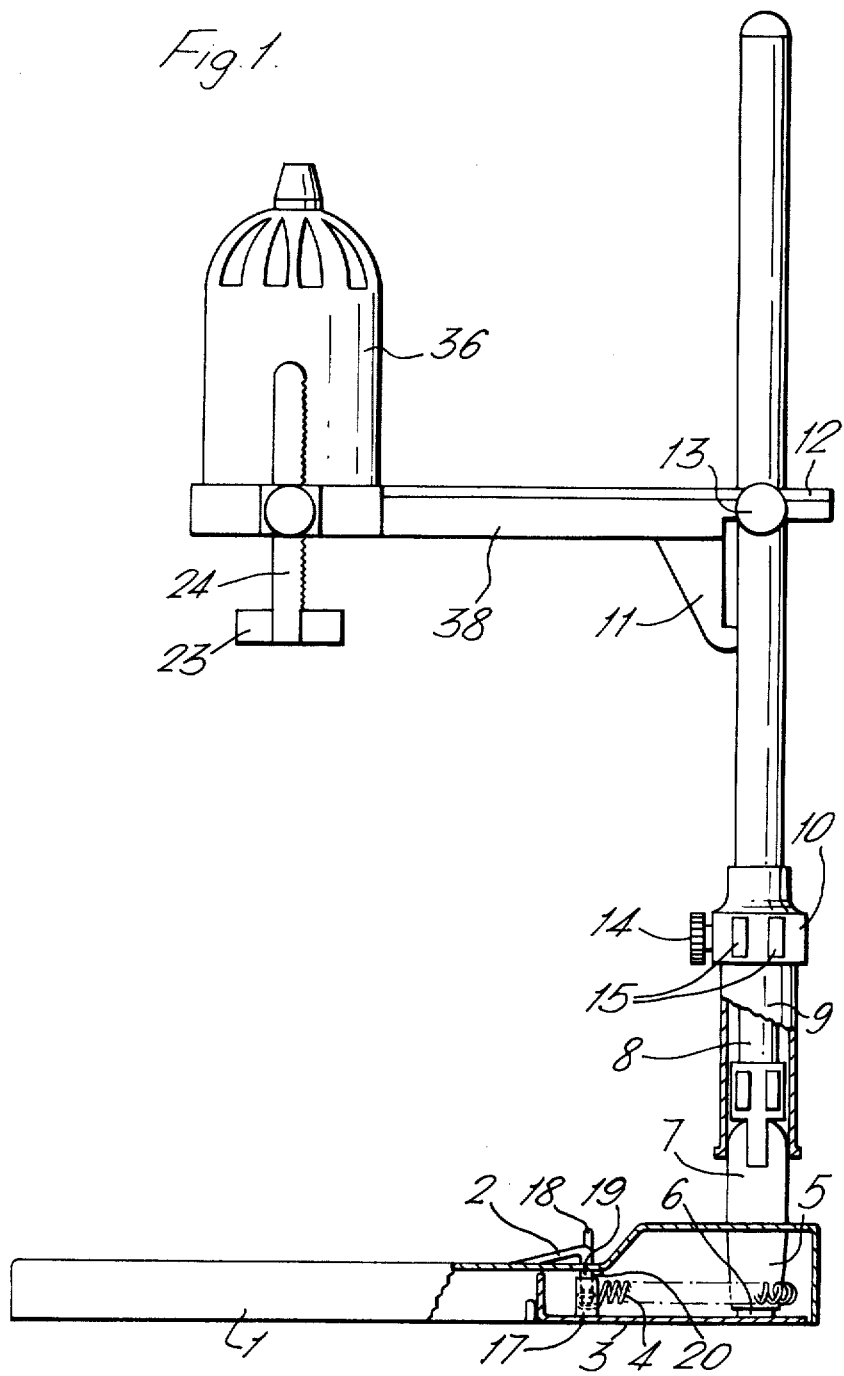
FIG. 1 is an elevational view of an improved slide projector constructed in accordance with the invention.
Figure 2:
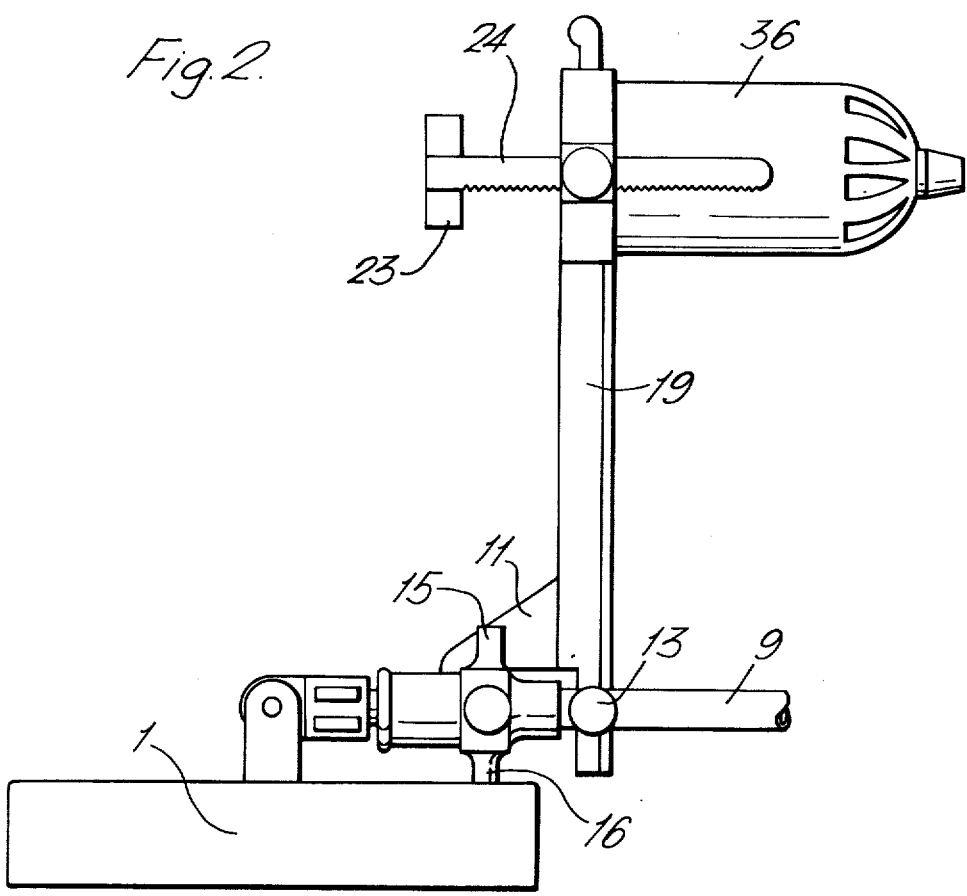
FIG. 2 is an elevational view of the embodiment shown in FIG. 1 with the slide projector and supporting column therefor in a rotated position for projecting a selected image on a vertical surface.

Referring now to FIGS. 1, 2 and 6, a base is provided for supporting the device including a projection platform 1 and an outer casing 3 connected thereto by a boss 6 which force fits within a concentric boss 5 carried on an elevated portion of platform 1. Topside and underside panels of platform 1 are respectively provided with aligned pairs of registered apertures for receiving opposed end segments 19 of configured resilient bar 2. Opposed end segments 19 of resilient bar 2 terminate in a respective angular elbow 20 received through respective aligned apertures 22 in the underside panel of platform 1 and are arranged in underlying, engaging relationship therewith. As best seen in FIG. 6, apertures 21 in underside panel of platform 1 communicate with apertures 22 therein and receive aligned pins 17 provided on casing 3 for maintaining angular elbows 20 in position in respective apertures 22. Angular elbows 22 of respective opposed end segments 19 of resilient bar 2 are provided with a support tab to which respective opposed ends of compression spring 4 are connected. Boss 5 carried in the elevated portion of the topside panel of platform 1 provides a compression support for spring 4.

As arranged, resilient bar 2 provides means for biasing a projection screen on the topside panel of platform 1 for receiving an image projected by the slide projector. Compression spring 4 urges angular elbows 20 against the side walls defining apertures 22 for biasing resilient bar 2 against the topside panel of platform 1. For releasing a biased projection screen, resilient bar 2 is urged upwardly by applying pressure to pressure tab 18 fixedly connected to resilient bar 2. Opposed end segments 19 and angular elbows 20 swivel in their respective apertures 22 until respective opposed end segments 19 abut opposite walls of apertures 22 for thereby limiting the upward movement of resilient bar 2 when pressure is applied to pressure tab 18 for raising resilient bar 2 from platform 1. Pins 17 provided on casing 3 and located in apertures 21 prevent displacement of angular elbows 19 from apertures 22 as resilient bar 2 is raised for releasing a projection screen therefrom.

Boss 5 force fitted at one end to boss 6 carried on casing 3 emerges through the elevated portion of the topside panel of platform 1. To the other end thereof a swivel clamp is connected by means of a pivot pin, not shown. Rod 8 force fits into the cap provided on the swivel clamp and the force fit may be releasable by arranging one or more leaf springs on the interior surface of the cap.

Clamp collar 10 is slidably mounted on rod 8 for telescoping along the length thereof. Clamp collar 10 includes a neck portion and a body portion which is provided with an interiorly threaded aperture communicating with rod 8. A nut 14 with a threaded stem is carried in the aperture for releasably locking clamp collar 10 in a desired position on rod 8. As best seen in FIG. 1, as clamp collar 10 is lowered tube 9 carried by clamp collar 10 slides over the pivot joint between boss 7 and the swivel clamp for vertically aligning elements 7 and 8 of the column supporting the slide projector. When elements of the column are vertically aligned, the slide projector projects an image on platform 1 of the base. As best seen in FIG. 2, clamp collar 10 may be telescoped upwardly on rod 8 and fastened thereto at some intermediate point above the pivot joint. Rod 8 may then be rotated 90° until wing 16 carried on clamp collar 10 engages platform 1 for supporting rod 8 and transversely arranging the slide projector for projecting an image on a vertical surface.

Figure 7:
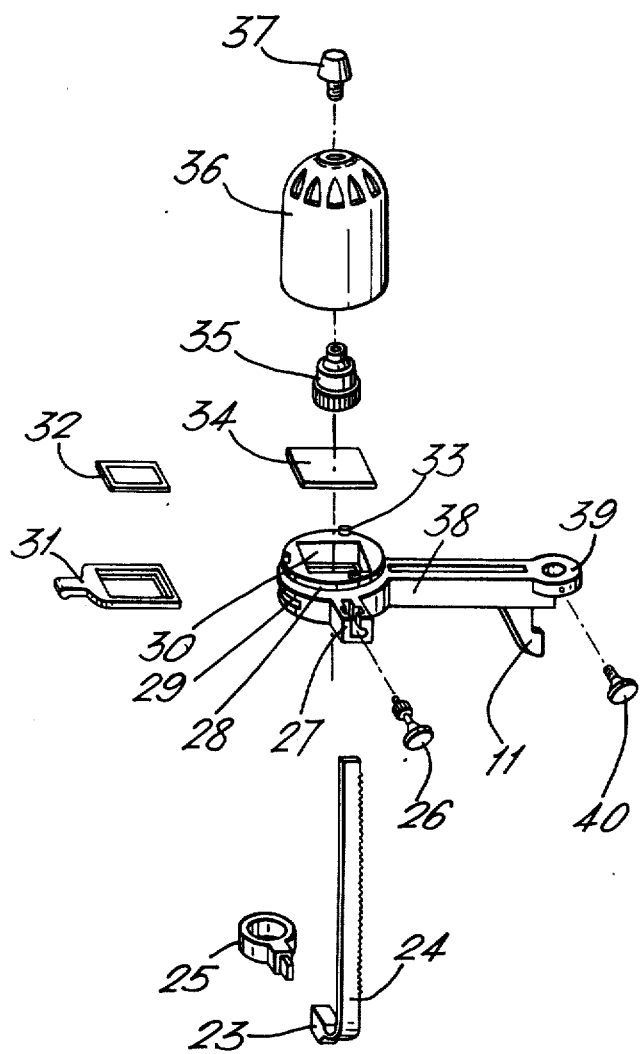
FIG. 7 is an exploded view of elements for a slide projector constructed in accordance with the invention.

As best seen in FIGS. 1 and 7, slide projector support arm 38 is provided at one end with a collar 39 for slidably connecting slide projector support arm 38 to rod 8. Captive screw 40 is carried in collar 39 for fixing the position of slide projector support arm 38 on rod 8, as desired. A bracket 11 is carried on the underside of slide projector support arm 38 for supporting the slide projector carried on said arm. The opposite end of slide projector support arm 38 widens into an expanded portion having a centrally located cutout over fitted by a light diffuser element 34 maintained in position over frame window 30 by equispaced studs 33 carried on the top surface of the expanded portion. The side wall of the expanded portion is provided with a laterally extending slot for receiving a slide 32 mounted in a frame 31. The top surface of the expanded portion is provided with an annular recess 28 providing a seat for the peripheral edge of projector housing 36. Laterally extending arm 27 connected to the expanded portion of supporting arm 38 carries a rack 24 and pinion 26 for adjusting the relative position of lens holder 25 relative to mounted slide 32. One end of rack 24 is provided with a hollow elbow 23 for removably fitting lens holder 25 thereto.

Lens holder 25 is a ring provided with a pair of parallel annular undercut portions in the interior surface thereof for supporting one, or perhaps two lenses filling the annulus defined by lens holder 25. Projector housing 36 is substantially bell-shaped and is provided with a plurality of ventilation slots near its apex where socket 35 is carried by a nut 37. Nut 37 is provided with an axial aperture for carrying a cable lead from socket 35 through housing 36 for hook-up to a suitable power source.

Thus when elements of the column are vertically aligned the projector projects an image onto platform 1 and performs like a table projector. When, however, rod 8 is free to pivot and it is lowered to a horizontal position supported on wing 16 of clamp collar 10 the slide projector is arranged for projecting a horizontal beam onto a vertical screen. When rod 8 is arranged in a horizontal position slide projector supporting arm 38 is rotated relative to rod 8 until it is vertically aligned with bracket 11 being supported between ribs 15 carried on the body portion of clamp collar 10 for locking slide projector support arm 38 in a vertical position and reinforcing the locking action effected by captive screw 40 carried in collar 39.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for projecting a slide comprising a base, a column mounted on said base and upstanding therefrom on a vertical axis, first means for projecting a selected image on said base along a first projection axis, said first means being dependent from said column and said column being provided with second means for rotating said column through a 90° arc to a second position normal to said vertical axis, whereby said depending first means is rotated through a concentric 90° arc for rotating said projection axis to a second position normal to said first projection axis, said base comprising a platform and a casing, said platform including an underside panel and an elevated topside side panel and means for receiving a casing securing means, said receiving means being located in said platform, said casing underlying said underside panel of said platform and being provided with means for securing said casing to said platform. said topside panel having first and second apertures therein spaced one from the other, and said underside panel of said platform being provided with first and second apertures therein spaced one from the other, respective apertures in said topside and underside panels being registered, one with the other, and means for releasably biasing a projection screen in overlying position on said platform, said last mentioned means having opposed end segments received through respective pairs of registered apertures in said topside and underside panels, said opposed end segments terminating in respective angular elbows received through respective apertures in said underside panel and in underlying, engaging relationship therewith.

2. The slide projector of claim 1 including a supporting arm for supporting aid first means and wherein said first means includes a projection lamp, a slide carrier and means for magnifying and focusing a projected image, said supporting arm being slidably connected at one end to said column and providing a support for said image projector at an other end thereof said projection lamp overlying said other end of said supporting arm, and said slide carrier being provided in said other end of said supporting arm, said projection lamp, said slide carrier and said means for magnifying and focusing a projected image being coaxially arranged, said last mentioned means being movably connected to said other end of said supporting arm for adjusting the position thereof relative to said other end of said supporting arm for bringing a magnified projected image into clear focus on an image receiving surface.

3. The slide projector of claim 2 wherein said other end of said supporting arm includes an expanded portion with top and bottom surfaces and a substantially continuous side wall therebetween, said expanded portion having a centrally located aperture there through for passing a projected image and said top surface being provided with a recessed peripheral edge for seating a projection lamp housing therein, a plurality of equispaced studs on said top surface for defining therebetween a receiving area for a light diffuser element of said image projector, said expanded portion side wall having a laterally extending slot communicating with said aperture for receiving a slide carrying an image thereon, and an arm connected to said side wall for carrying said means for magnifying and focusing a projected image.

4. The slide projector of claim 3 wherein said means for releasably connecting said magnifying and focusing means to said arm comprises a driven member and means for driving said driven member, said driven member being carried in a slot provided therefor in said arm and said means for driving said driven member being carried in said arm for frictionally engaging said driven member.

5. The slide projector of claim 4 including an annular member releasably connected to said driven member and a magnifying lens carried in the annulus of said annular member.

6. The slide projector of claim 1, wherein said column comprises a boss mounted at one end thereof on said base, a swivel clamp pivotally connected at one end thereof to an other end of said boss, a rod releasably connected to an other end of said swivel clamp and a clamp collar slidably mounted on said rod, said clamp collar being adjustable to a first position on said rod for axially aligning said rod and said boss.

7. The slide projector of claim 6 wherein said clamp collar includes a neck portion and a body portion, said body portion having an interiorly threaded aperture communicating with said rod, a nut provided with a threaded stem carried in said aperture for releasably locking said clamp collar in a desired position on said rod, a wing carried on said body portion of said clamp collar for supporting said rod and first means on said base in respective second positions of said rod and said first means, said body portion of said clamp collar being slidable over said swivel clamp and the pivotal connection thereof with said boss for fixing said column and first means in respective first position thereof.

* * * * *